United States Patent
Dong et al.

(10) Patent No.: US 11,382,142 B2
(45) Date of Patent: Jul. 5, 2022

(54) RANDOM ACCESS METHOD AND DEVICE, STORAGE MEDIUM, AND ELECTRONIC DEVICE

(71) Applicant: ZTE Corporation, Shenzhen (CN)

(72) Inventors: Fei Dong, Shenzhen (CN); He Huang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/056,114

(22) PCT Filed: May 14, 2019

(86) PCT No.: PCT/CN2019/086836
§ 371 (c)(1),
(2) Date: Nov. 17, 2020

(87) PCT Pub. No.: WO2019/219003
PCT Pub. Date: Nov. 21, 2019

(65) Prior Publication Data
US 2021/0212115 A1 Jul. 8, 2021

(30) Foreign Application Priority Data
May 17, 2018 (CN) .......................... 201810476241.1

(51) Int. Cl.
*H04W 74/08* (2009.01)
*H04W 72/04* (2009.01)

(52) U.S. Cl.
CPC ....... *H04W 74/085* (2013.01); *H04W 72/044* (2013.01)

(58) Field of Classification Search
CPC ............. H04W 72/044; H04W 74/004; H04W 74/006; H04W 74/008; H04W 74/0833; H04W 74/085
See application file for complete search history.

(56) References Cited

U.S. PATENT DOCUMENTS

2015/0085689 A1  3/2015  Vos
2015/0282215 A1  10/2015 Eriksson
(Continued)

FOREIGN PATENT DOCUMENTS

CN   102573101 A   7/2012
CN   106941730 A   7/2017
(Continued)

OTHER PUBLICATIONS

3GPP TSG-RAN WG2 Meeting #100, Fujitsu, "RA-RNTI calculation", Nov. 1, 2017, R2-1712977.
(Continued)

*Primary Examiner* — Kashif Siddiqui
(74) *Attorney, Agent, or Firm* — Cantor Colburn LLP (57) ABSTRACT

Provided are a random access method and device, a storage medium, and an electronic device. The method comprises: acquiring a random access resource pool or a random access type of a PRACH; receiving a random access response message according to the random access resource pool or the random access type. By means of the present disclosure, the technical problem in the related art that a resource conflict is caused due to the fact that a received RAR cannot be determined is solved.

16 Claims, 7 Drawing Sheets

(56) References Cited

U.S. PATENT DOCUMENTS

| | | | |
|---|---|---|---|
| 2017/0231011 A1* | 8/2017 | Park | H04W 74/006 |
| 2017/0280481 A1 | 9/2017 | Stern-Berkowitz | |
| 2018/0332520 A1* | 11/2018 | Cheng | H04W 36/0016 |
| 2019/0053271 A1* | 2/2019 | Islam | H04W 74/0833 |
| 2019/0313437 A1* | 10/2019 | Jung | H04L 5/0042 |
| 2020/0084828 A1* | 3/2020 | Loehr | H04L 1/1874 |
| 2020/0367288 A1* | 11/2020 | Dahlman | H04W 74/0833 |

FOREIGN PATENT DOCUMENTS

| | | |
|---|---|---|
| CN | 107872888 A | 4/2018 |
| WO | 2018143762 A1 | 8/2018 |
| WO | 2019098906 A1 | 5/2019 |

OTHER PUBLICATIONS

3GPP., 3rd Generation Partnership Project: Technical Specification Group Radio Access Network: NR Medium Access Control (MAC) Protocol Specification (Release 15), 3GPP TS 38.321 V15.1.0, Mar. 31, 2018.

International Search Report for corresponding application PCT/CN2019/086836 filed May 14, 2019; dated Jul. 31, 2019.

\* cited by examiner

RANDOM ACCESS METHOD AND DEVICE, STORAGE MEDIUM, AND ELECTRONIC DEVICE

TECHNICAL FIELD

The present disclosure relates to the field of communications, and in particular to a random access method and device, a storage medium and an electronic device.

BACKGROUND

In an LTE system in the related art, before sending data to a base station, a UE in a connected state needs to acquire uplink synchronization and downlink synchronization with the base station. When the UE performs measurement on a cell, that is, the UE has obtained downlink synchronization with the cell; otherwise, a similar cell search process needs to be performed. The uplink synchronization is obtained by performing random access procedure.

Figure 1:
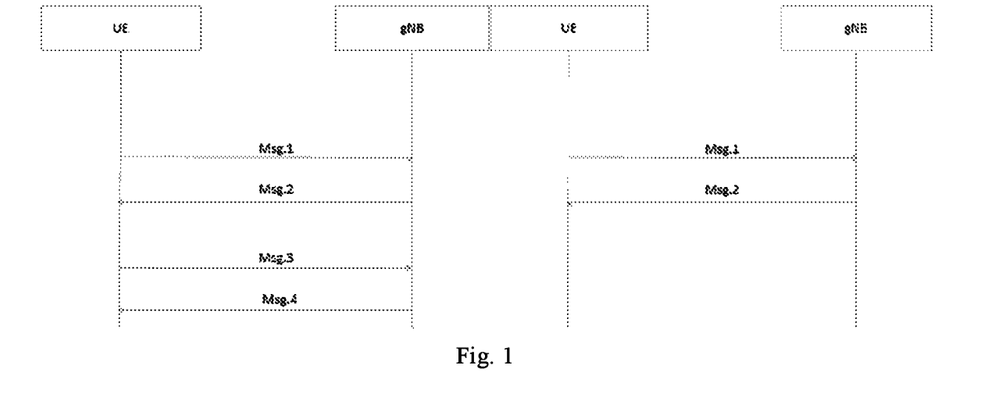
FIG. 1 is a flowchart of a random access procedure in the related art.

A random access process in an LTE system is shown in FIG. 1, and FIG. 1 is a flowchart of a random access process in the related art of the present disclosure. The random access process may be a Physical Downlink Control Channel (PDCCH order) or a Media Access Control (MAC) layer of the UE, Medium Access Control or Radio Resource Control (RRC), Radio Resource Control signalling is initiated, see step 0 in FIG. 1, in an embodiment of the present disclosure, The PDCCH order or the RRC signaling can allocate a dedicated random access preamble for the UE, the random access procedure is a non-conflicting mode, the dedicated random access preamble can only be allocated by the base station, It may be configured by a PDCCH order or a switching command; otherwise, the UE needs to select a random access preamble by itself, and the random access process is in a conflict mode, and in this case, step 0 does not exist, and step 1 is directly performed. A UE selects a random access resource, comprising selecting a random access preamble, a time-frequency domain resource of a physical random access channel (PRACH), etc., and sends the preamble on the selected random access resource, which is referred to as a sent message 1. For a non-conflicting random access process, there is no conflict resolution process, which is realized by allocating a dedicated preamble code to a terminal by a network side. The random access process based on collision (Contention based) is shown in FIG. 1, comprising four steps, in which steps 3 and 4 are used for solving collision, and the non-collision process only has the first two steps. If the terminal does not receive the RAR (Random Access Response) or the received RAR does not match the preamble sent, the terminal needs to resend the Msg. 1.

In order to adapt to scenarios of multiple services, multiple demands and multiple wireless environments in an NR, multiple sets of RACH (Random Access Channel) configurations may be introduced in the related art to independently configure resources so as to adapt to different types of RACH types, for example, CFRA (Contention Free Random Access), CBRA (Contention based Random Access), SI request. Thus, the service requirement of the NR is achieved. However, introducing multiple sets of independently configured resources will introduce additional conflicts, making the conflict solution under the original LTE no longer applicable.

Aiming at the above described problems existing in the related art, no effective solution has been found at present.

SUMMARY

Embodiments of the present disclosure provide a random access method and device, a storage medium, and an electronic device.

According to an embodiment of the present disclosure, a random access method is provided, comprising: acquiring a random access resource pool or a random access type of a physical random access channel (PRACH); receive a random access response message according to the random access resource pool or the random access type.

According to an embodiment of the present disclosure, there is provided another random access method, including: a network side receives a random access preamble, and sends a random access response (RAR) according to a physical resource pool corresponding to the random access preamble or a random access type.

According to one embodiment of the present disclosure, another random access method is provided, comprising: a UE sends a random access preamble, and receives a random access response (RAR) according to a physical resource pool or random access type corresponding to the random access preamble.

According to another embodiment of the present disclosure, provided is a terminal, comprising: an acquisition module, configured to acquire a random access resource pool or a random access type of a physical random access channel (PRACH); and a receiving module, configured to receive random access response message according to the random access resource pool or random access type.

According to another embodiment of the present disclosure, another terminal is provided, comprising: a sending module configured to send a random access preamble; and a receiving module, configured to receive random access response (RAR) according to a physical resource pool or random access type corresponding to the random access preamble.

According to another embodiment of the present disclosure, provided is a base station, comprising: a receiving module, configured to receive a random access preamble; a sending module, configured to send random access response (RAR) according to a physical resource pool or random access type corresponding to the random access preamble.

According to another embodiment of the present disclosure, a storage medium is also provided. The storage medium stores a computer program, wherein the computer program is configured to run to execute the steps in any one of the method embodiments.

According to another embodiment of the present disclosure, also provided is an electronic device, comprising a memory and a processor, wherein the memory stores a computer program, and the processor is configured to run the computer program so as to execute the steps in any one of the method embodiments.

By means of the present disclosure, a random access resource pool or a random access type of a PRACH is acquired, and a random access response is received according to the random access resource pool or the random access type, so that conflict is avoided by using different random access manners, thereby solving the technical problem in the related art that a resource conflict is caused due to the fact that a received RAR cannot be determined.

BRIEF DESCRIPTION OF THE DRAWINGS

Drawings, provided for further understanding of the present disclosure and forming a part of the description, are used to explain the present disclosure together with exemplary embodiments of the present disclosure rather than to limit the present disclosure. In the drawings.

DETAILED DESCRIPTION OF THE EMULSIONS

Hereinafter, the present disclosure will be described in detail with reference to the accompanying drawings and embodiments. It is important to note that the embodiments of the present disclosure and the characteristics in the embodiments can be combined under the condition of no conflicts.

It should be noted that, terms such as "first" and "second" in the description, claims, and accompanying drawings of the present disclosure are used to distinguish similar objects, but are not necessarily used to describe a specific sequence or order.

Embodiment 1

The embodiments of the present application can be implemented in a network scenario as shown in FIG. 1. As shown in FIG. 1, the network architecture comprises: a terminal UE and a base station (such as an NB), wherein the terminal initiates random access to the base station.

Figure 2:
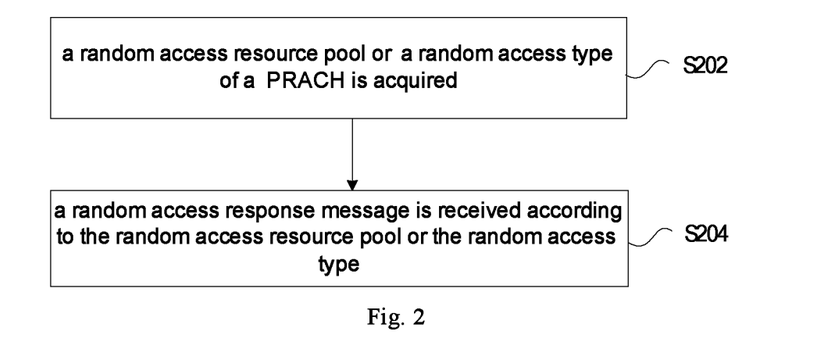
FIG. 2 is a flowchart of a random access method according to an embodiment of the present disclosure.

The present embodiment provides a random access method running on the described network architecture. FIG. 2 is a flowchart of a random access method according to an embodiment of the present disclosure. As shown in FIG. 2, the flow comprises the following steps:

Step S202: a random access resource pool or a random access type of a physical random access channel PRACH is acquired; and Step S204: a random access response message is received according to the random access resource pool or the random access type.

By means of the above described steps, a random access resource pool or random access type of a PRACH is acquired, and random access response is received according to the random access resource pool or random access type; and collision is avoided by using different random access manners, thereby solving the technical problem in the related art that resource collision is caused due to the fact that a received RAR cannot be determined.

In an embodiment of the present disclosure, an execution subject of the foregoing steps may be a terminal, such as a mobile phone, but is not limited thereto.

In an embodiment of the present disclosure, acquiring a random access resource pool of a PRACH comprises one of the following: acquiring a resource pool used for contention-based random access (CBRA) through a radio resource control (RRC) message; acquiring a resource pool for a non-contention based random access (CFRA) via an RRC message; acquiring a resource pool used for a system message request via an RRC message;

The RRC message is a dedicated RRC message or a system message.

In an embodiment of the present disclosure, the random access type comprises one of the following: CBRA, CFRA, random access for a system information request (SI request).

In an embodiment of the present disclosure, the method for receiving random access response message according to a random access resource pool or a random access type comprises one of the following:

determining a physical resource for receiving a random access response message according to a random access resource pool or a random access type, wherein the physical resource comprises at least one of the following: a control resource set (CORESET), bandwidth part (Band Wide Part, BWP), wherein the BWP is bandwidth part of a whole cell bandwidth used by a terminal;

determining an Random Access Radio Network Temporary Identifier (RA-RNTI) for receiving a random access response message according to the random access resource pool or the random access type;

receiving the corresponding RAR information by using the physical resource and the RA-RNTI.

In this embodiment, a terminal calculates a corresponding RA-RNTI according to different access modes so as to avoid collision; and when calculating the RA-RNTI, the UE will add a different random access type section, in which the different random access type section, and determining an RA-RNTI used for receiving a random access response message according to a random access resource pool or a random access type comprises:

calculating a currently used random access radio network temporary identifier by using the following formula;

$$\text{RA-RNTI: RA-RNTI}=1+s\_id+14 \times t\_id+14 \times 80 \times f\_id+ 14 \times 80 \times 8 \times ul\_carrier\_id+14 \times 80 \times 8 \times 2 \times \text{RA type};$$

wherein s_id is a symbol identifier (symbol ID) of the used PRACH resource used, t_id is an id of a time slot identifier of the used PRACH resource, f_id is a frequency division multiplexing identifier (FDM ID) of the used PRACH resource, ul_carrier_id is an uplink carrier identifier (id) of the used PRACH resource, and an RA type value is an identifier of the random access resource pool or an identifier of the random access type.

In an embodiment of the present disclosure, the method for determining a physical resource for receiving a random access response message according to the random access resource pool or the random access type comprises:

a physical resource corresponding to the random access resource pool or a random access type and used for receiving a random access response message according to a mapping relationship, and monitoring an RA-RNTI on the corresponding physical resource; the mapping relationship is configured by an RRC message.

In this embodiment, a terminal avoids collision according to an access method identifier in a received RAR, and modifies an RAR frame structure, which includes but is not limited to changing a partial reserved word in the RAR to a function word, so as to indicate a random access type replied by the RAR, for example, RA type=1 represents an RAR which is a CBRA, and if RA type=0, represents an RAR which is a CFRA, so that the UE determines whether the RAR is a valid RAR according to the random access type thereof. Alternatively, the RA type may also be replaced by a resource pool identifier, RA type=1 indicates resource pool 1, and RA type=2 indicates resource pool 2, where definitions or uses of resource pools 1 and 2 are agreed by a protocol or configured by an RRC layer protocol. The method for receiving corresponding RAR information according to a random access resource pool or a random access type comprises:

S11, receiving corresponding RAR information in a random access response message, wherein the corresponding RAR information is RAR information having an RAP (Random Access Preamble) ID matched with a preamble ID used in the current RA process;

S12, parsing RAR information to obtain first identification information about a random access type or second identification information about a random access resource pool carried in the RAR information;

S13, when the first identifier matches the random access type, determining that the received RAR information is response message of the current random access; or determining that the received RAR information is response message for the current random access when the second identifier matches the resource pool used in the current RA procedure, when the first identifier does not match the random access type, determining that the received RAR information is not response message of the current RA; or when the second identifier does not match the resource pool used in the current RA process, determining that the received RAR information is not response message for the current random access.

In this embodiment, a terminal receives an RAR on a corresponding CORE SET according to a random access mode so as to avoid collision; and after sending an Msg.1, the UE starts an RAR window and waits to receive an RAR, and then monitors the corresponding CORE according to different random access modes so as to distinguish a CBRA from a CFRA. Alternatively, different CORESETS resources are configured for different RA resource pools, and a mapping relationship between the RA resource pool and the CORESETS is configured by an RRC layer protocol, or agreed by a protocol (for example, CORESET0 is used for CBRA, CORESET1 is used for CFRA, etc.), and after a random access resource pool or random access type of a physical random access channel (PRACH) is acquired, the method further comprises: calculating an RA-RNTI currently used; using an RA-RNTI to monitor a CORESET.

In an embodiment of the present disclosure, using the RA-RNTI to monitor the CORESET comprises one of the following: using the RA-RNTI to monitor a dedicated CORESET corresponding to the random access type; monitoring the dedicated CORESETs corresponding to the random access resource pool using the RA-RNTI.

In the embodiments of the present disclosure, a random access method is further provided, and the method comprises: a network side receives a random access preamble, and sends random access response message (RAR) according to a physical resource pool corresponding to the random access preamble or a random access type.

In the embodiments of the present disclosure, a random access method is further provided, and the method comprises: a terminal UE sends a random access preamble, and receives random access response message (RAR) according to a physical resource pool or a random access type corresponding to the random access preamble.

Through the description of the foregoing embodiments, a person skilled in the art may clearly understand that the method according to the foregoing embodiments may be implemented by software in addition to a necessary universal hardware platform, and definitely may also be implemented by hardware. However, in many cases, the former is a preferred implementation. Based on such understanding, the technical solutions of the present disclosure essentially, or the part contributing to the related art, may be embodied in the form of a software product, the computer software product is stored in a storage medium (such as a ROM/RAM, a magnetic disk and an optical disk), comprising several instructions for enabling a terminal device (which may be a mobile phone), a computer, a server, or a network device.

Embodiment 2

The embodiment further provides a terminal for implementing the described embodiment and example implementation mode, and what has been described will not be elaborated. The term "module", as used hereinafter, is a combination of software and/or hardware capable of realizing a predetermined function. Although the device described in the following embodiment is preferably implemented by software, implementation of hardware or a combination of software and hardware is also possible and conceived.

Figure 3:
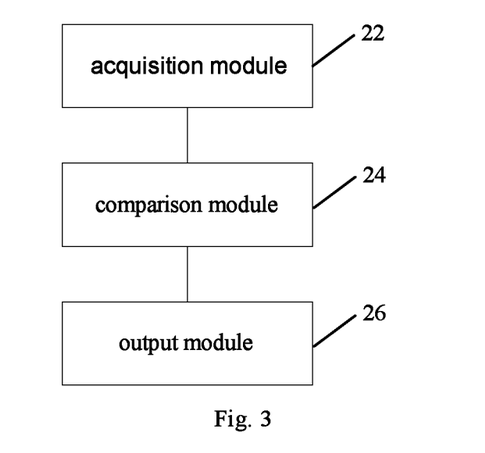
FIG. 3 is a structural block diagram of a terminal according to an embodiment of the present disclosure.

FIG. 3 is a structural block diagram of a terminal according to an embodiment of the present disclosure. As shown in FIG. 3, the device includes:

an acquisition module 30, configured to acquire a random access resource pool or a random access type of a physical random access channel (PRACH);

a receiving module 32, configured to receive f random access response according to the random access resource pool or random access type.

An embodiment further provides a terminal, which comprises: a sending module, configured to send a random access preamble; a receiving module, configured to receive a random access response (RAR) according to a physical resource pool or random access type corresponding to the random access preamble.

An embodiment of the present disclosure further provides a network side device. For example, a base station. The network side device comprises: a receiving module, configured to receive a random access preamble; a sending module, configured to send a random access response (RAR) according to a physical resource pool corresponding to the random access preamble or a random access type.

It should be noted that each module may be implemented by software or hardware. The latter may be implemented in the following manner, but is not limited thereto. All the modules are located in a same processor; alternatively, the modules are located in different processors in an arbitrary combination.

Embodiment 3

The present embodiment provides a method for setting random access of a user equipment, which can be applied in NR, in order to avoid the problem of insufficient random access resources, the 3GPP allows a plurality of sets of RACH configurations to be configured according to random access requirements or types for different purposes so as to meet the requirements of different types of access modes (for example, different resource pools (including time domain resources and frequency domain resources) and/or independent preamble sets are configured for the CFRA, CBRA and SI request), thereby reducing the time delay and improving the reliability. However, the UEs in the two resource pools may use two same relative locations, plus the same combination of time domain and preamble, and the UEs may calculate to obtain the same RA-RNTI, and because the preambles are the same, the UEs cannot distinguish that the RAR carried in the msg2 is given to users in that resource pool, thereby causing a conflict. In order to solve the described problem, the present embodiment provides three solutions:

1: Redesign a RA-RNTI calculation method to ensure that UEs using different resource pools (e.g., when separate RA resource configurations are configured for CBRA and CFRA) have different RA-RNTIs.

2: Redesigning the RAR receiving channel CORESETs such that different resource pools can be distinguished (e.g., using different CORESETs for CFRA and CBRA to receive msg2)

3: Redesign the RAR frame structure so that the RAR frame structure carries an access type identifier.

With regard to method one, when calculating an RA-RNTI, a UE will add a differentiated random access type portion, in which the differentiated random access type portion comprises but is not limited to the following calculation formula:

$$RA\text{-}RNTI = 1 + s\_id + 14 \times t\_id + 14 \times 80 \times f\_id + 14 \times 80 \times 8 \times ul\_carrier\_id + 14 \times 80 \times 8 \times 2 \times RA \text{ type ID}.$$

When initiating the CFRA, RA type ID=0, when initiating the CBRA, RA type ID=1, and when initiating the SI request, RA type ID=2. Alternatively, the RA type may also be replaced by a resource pool identifier, RA type=1 indicates resource pool 1, and RA type=2 indicates resource pool 2, where definitions or uses of resource pools 1 and 2 are agreed by a protocol or configured by an RRC layer protocol.

With regard to method II, after sending Msg.1, a UE starts an RAR window and waits to receive an RAR, and monitors a corresponding CORESET according to different random access modes, so as to distinguish a CBRA from a CFRA. Alternatively, different CORESETS resources are configured for different RA resource pools, and a mapping relationship between the RA resource pool and the CORESETS is configured by an RRC layer protocol, or agreed by a protocol (for example, CORESET 0 is used for CBRA, and CORESET1 is used for CFRA, etc.).

With regard to method three, an RAR frame structure is modified, including but not limited to modifying a partial reserved word into a function word in an RAR, so as to indicate a random access type replied by the RAR, for example, RA type=1 represents an RAR which is a CBRA, and if RA type=0, represents an RAR which is a CFRA, so that a UE determines whether it is a valid RAR according to the random access type thereof. Alternatively, the RA type may also be replaced by a resource pool identifier, RA type=1 indicates resource pool 1, and RA type=2 indicates resource pool 2, where definitions or uses of resource pools 1 and 2 are agreed by a protocol or configured by an RRC layer protocol.

In this embodiment, different RA resource pools are different in one or more of the following parameters.

prach-ConfigurationIndex=PRACH configuration msg1-FDM=» of frequency division multiple channels available for Msg1 in the current PRACH channel at the same time instant.

msg1-Frequency Start=» relates to the L1 parameter 'prach-frequency-start' (see 38.211)

zeroCorrelationZoneConfig preambleReceivedTargetPower preambleTransMax=>maximum transmission times for Preamble before failure of random access procedure power RampingStep ra-ResponseWindow Alternatively, different RA resource pools may have different RACH-Configgeneric configurations. RACH-Configgeneric contains at least the following parameters:

prach-ConfigurationIndex=PRACH configuration msg1-FDM=» at the same moment, the number of frequency division multiple paths available for Msg.1 in the current PRACH channel.

msg1-Frequency Start=» relates to the L1 parameter 'prach-frequency-start' (reference 38,211,)

zeroCorrelationZoneConfig.

Corresponding to the foregoing conflict avoidance mechanism, this embodiment is described through different implementations:

Embodiment 1

The terminal calculates the corresponding RA-RNTI according to different access modes to avoid collision.

Example 1: RA-RNTI calculation relies on access type in CBRA process

Figure 4:
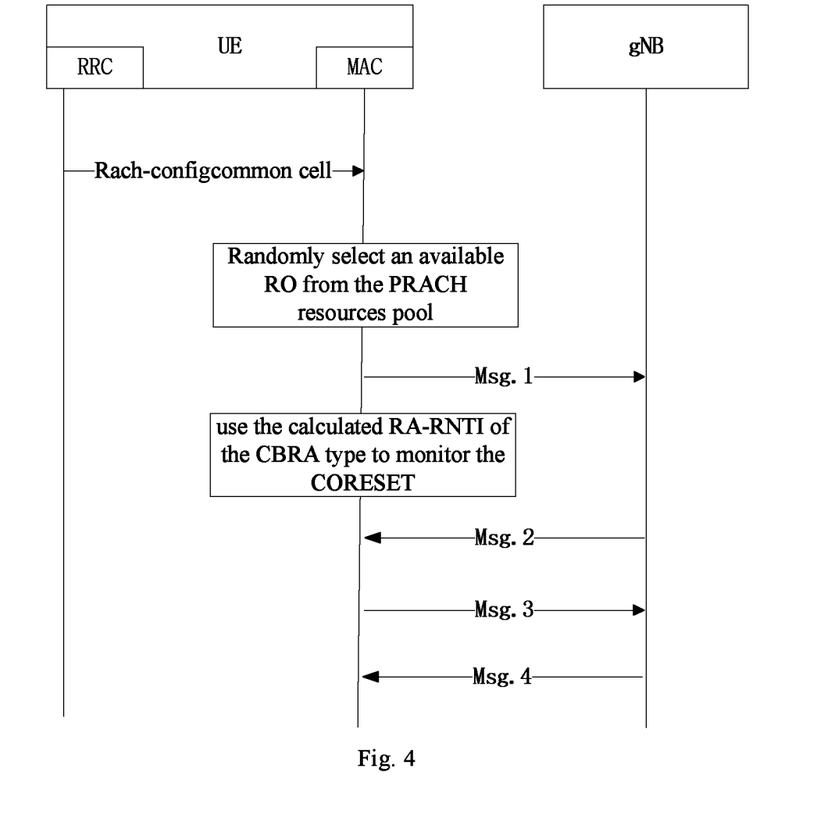
FIG. 4 is a flowchart of Example 1 of the present disclosure.

For a detailed flowchart of this embodiment, reference may be made to FIG. 4, FIG. 4 is a flowchart of Example 1 of the present disclosure.

Step 1: after a UE normally resides in an NR cell, the UE needs to enter an RRC connection state, and at this time, the UE needs to initiate a random access process. A UE obtains a configuration information element of a random access resource from an RRC message, acquires a PRACH resource pool and a Preamble set which can be used in a random access process therefrom, and randomly selects a resource used in this RACH access from the resource pool and the Preamble set.

Step 2: the UE transmits msg.1 using an RO (Random Access Channel occasion, RACH occasion) and preamble selected through step 1

Step 3: the UE calculates an RA-RNTI via the selected PRACH resource, and the calculation formula is:

$$RA\text{-}RNTI = 1 + s\_id + 14 \times t\_id + 14 \times 80 \times f\_id + 14 \times 80 \times 8 \times ul\_carrier\_id + 14 \times 80 \times 8 \times 2 \times RA \text{ type}$$

where s_id is the ID of the symbol of the PRACH resource used, t_id is the id of the slot of the PRACH resource used, f_id is the FDM ID of the PRACH resource used, ul_carrier_id is the uplink carrier id of the PRACH resource used (where NUL is a common uplink carrier, and SUL is a supplementary uplink carrier), RA type, is the classification of RACH performed by the current UE, where RA type of CFRA=1, RA type of CBRA=0, and RA type of SI request=2.

Since the type of the current access is CBRA, RA type=0, and the root obtains s_id, t_id, f_id, ul_carrier_id according to the location of the sent PRACH resource to calculate the current RA-RNTI.

Step 4: the UE monitors the CORESET through the RA-RNTI calculated in step 3; when receiving a PDCCH ORDER scrambled by the RA-RNTI and being able to successfully decode RAR (msg.2) information, and when the RAPID is consistent with the sent Preamble ID, the UE considers that the reception of the RAR message is successful, and sets the message to be the TC-RNTI according to the content of the message carried by the RAR Step 5: the UE sends Msg.3 to the gNB via the UL grant obtained by decoding the RAR message and according to the channel resource allocated by the UL grant, and requests to establish an RRC connection.

Step 6: the UE monitors the CORESET through the TC-RNTI obtained in step 4; when receiving a PDCCH order scrambled by the TC-RNTI and successfully decoding the msg.4 message, the UE considers that this random access contention is successful and enters an RRC connection state when the obtained cell of the ID for which the contention resolution is performed is consistent with the CCCH SDU of Msg.3.

Figure 5:
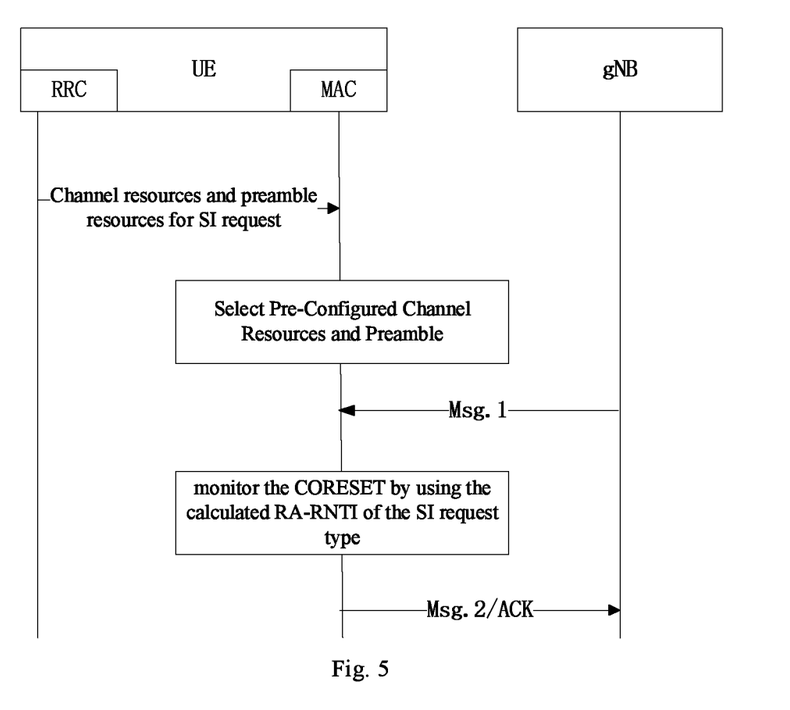
FIG. 5 is a flowchart of Example 2 of the present disclosure.

Example 2: during a system information request (SI Request), RA-RNTI calculation relies on current access type Reference may be made to FIG. 5 for a detailed flowchart of this example, and FIG. 5 is a flowchart of example 2 of the present disclosure.

Step 1: after the terminal camps in the NR cell, if the UE does not enter into a connected state, when the UE needs to acquire a required system message through an SI request process, the MAC acquires an SI request configuration parameter, for example, PRACH resources and a preamble index corresponding to the system message type, through an RRC message.

Step 2: the terminal selects a preamble index pre-configured in the RRC message, selects an RO bearing the preamble from a pre-configured available resource pool, and sends the preamble to the RO.

Step 3: the UE calculates the RA-RNTI of the current transmission according to the currently selected RO. The calculation formula is as follows:

$$RA\text{-}RNTI = 1 + s\_id + 14 \times t\_id + 14 \times 80 \times f\_id + 14 \times 80 \times 8 \times ul\_carrier\_id + 14 \times 80 \times 8 \times 2 \times RA\ type.$$

where s_id is the ID of the symbol of the PRACH resource used, t_id is the id of the slot of the PRACH resource used, f_id is the FDM ID of the PRACH resource used, ul_carrier_id is the uplink carrier id of the PRACH resource used (where NUL is a common uplink carrier, and SUL is a supplementary uplink carrier), RA type, is the classification of RACH performed by the current UE, where RA type of CFRA=1, RA type of CBRA=0, and RA type of SI request=2.

Since the access type is an SI request, RA type=2, and s_id, t_id, f_id, ul_carrier_id are acquired according to the location of the transmitted PRACH resource to calculate the current RA-RNTI.

Step 4: the UE monitors the CORESET through the RA-RNTI calculated in Step 3; when receiving the PDCCH ORDER scrambled by the RA-RNTI and being able to successfully decode the RAR (msg.2) information, and when the RAPID is consistent with the sent Preamble ID, the UE considers that the RAR message is successfully received, and considers that the SI request is ACK; and at this time, the UE waits to receive the required system message on a pre-configured time-frequency resource.

Figure 6:
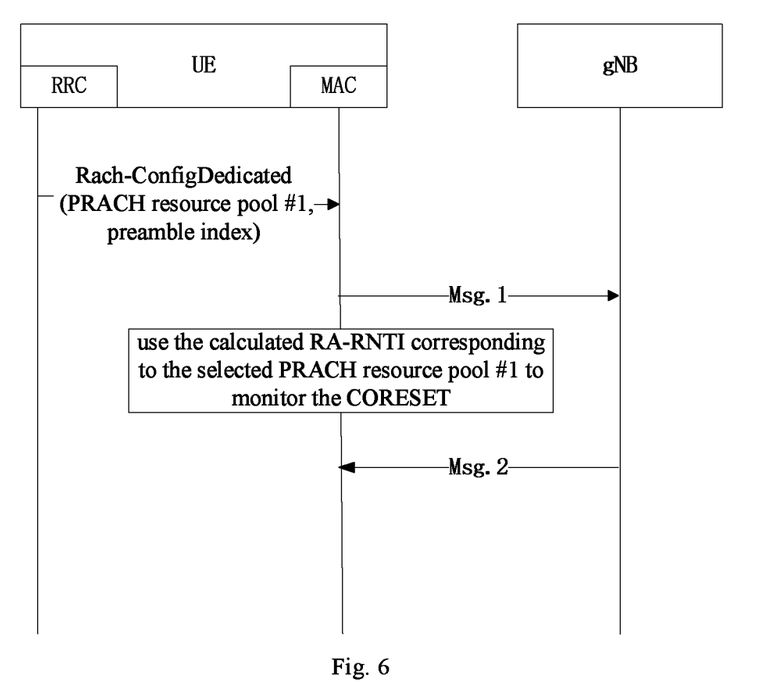
FIG. 6 is a flowchart of Example 3 of the present disclosure.

Example 3: RA-RNTI calculates mapping dependent PRACH resource pool identity during CFRA procedure The detailed flowchart of this embodiment is shown in FIG. 6, and FIG. 6 is a flowchart of Example 3 of the present disclosure.

Step 1: after a terminal camps on a current cell and enters a connected state, when a CFRA process is triggered, the UE acquires a PRACH resource pool required by the CFRA, for example, a PRACH resource pool #1 and a designated preamble, from an RRC message.

Step 2: the user equipment selects an RO carrying the preamble signaling from the specified PRACH resource pool #1, and transmits the preamble pre-configured by the RRC over the selected RO.

Step 3: the UE calculates the RA-RNTI of the current transmission according to the currently selected RO. The calculation formula is as follows:

$$RA\text{-}RNTI = 1 + s\_id + 14 \times t\_id + 14 \times 80 \times f\_id + 14 \times 80 \times 8 \times ul\_carrier\_id + 14 \times 80 \times 8 \times 2 \times RA\ type$$

wherein s_id is the ID of the symbol of the PRACH resource used, t_id is the id of the slot of the PRACH resource used, f_id is the FDM ID of the PRACH resource used, ul_carrier_id is the uplink carrier id of the PRACH resource used (wherein the NUL is a common uplink carrier, and the SUL is a supplementary uplink carrier), and the value of the RA type is obtained according to a PRACH Resources pool mapping relationship configured by RRC, for example, the RA type corresponding to PRACH Resource pool #0 being equal to 0; RA type=1 corresponding to PRACH Resource pool #1; PRACH Resource Pool #2 corresponds to RA type=2.

The current transmission of Msg.1 uses PRACH Resource pool #1, so it obtains RA type=1, and then acquires s_id, t_id, f_id, ul_carrier_id according to the location of the sent PRACH resource to calculate the current RA-RNTI.

Step 4: the UE monitors the CORESET according to the RA-RNTI calculated in Step 3. When receiving PDCCH ORDER scrambled by the RA-RNTI and being able to successfully decode the RAR (msg.2) information, if the RAPID is consistent with the sent Preamble ID, the UE considers that the reception of the RAR message is successful, and considers that this CFRA process is successfully ended.

Embodiment 2 the terminal receiving the RAR on the corresponding CORESET according to the random access mode so as to avoid collision.

Figure 7:
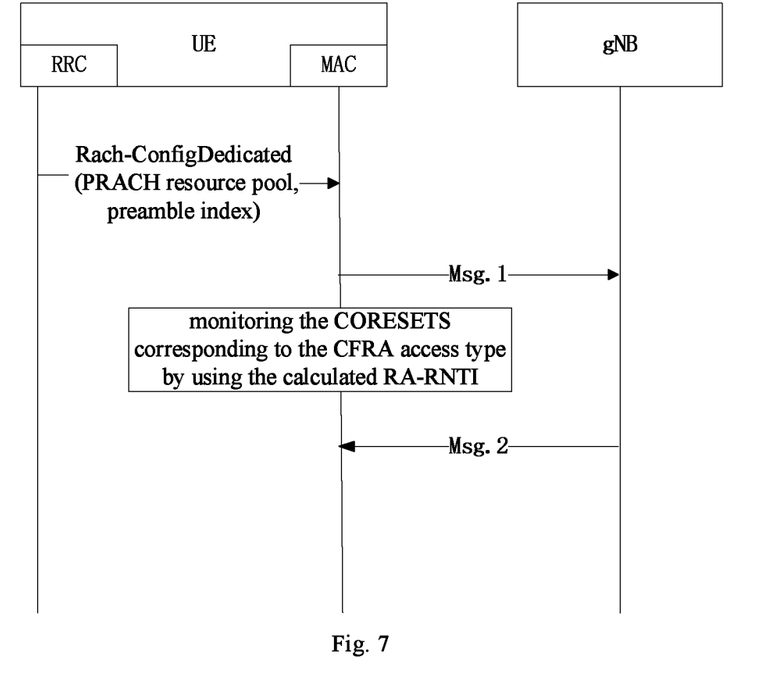
FIG. 7 is a flowchart of Example 4 of the present disclosure.

Example 4: in a CFRA procedure, select a corresponding CORESET listening RAR according to an access type Please refer to FIG. 7 for a detailed flowchart of this embodiment, and FIG. 7 is a flowchart of Example 4 of the present disclosure.

Step 1: when a terminal camps on a current cell and is in a connected state, and when a CFRA process is triggered, the UE acquires a PRACH resource pool required by the CFRA and a specified preamble from an RRC message.

Step 2: the user equipment selects an RO carrying a preamble signaling from the specified PRACH resource pool, and transmits the preamble pre-configured by the RRC over the selected RO.

Step 3: the UE calculates the RA-RNTI of the current transmission according to the currently selected RO.

Step 4: the UE monitors the CFRA dedicated CORESET according to the RA-RNTI calculated in step 3; when receiving the PDCCH ORDER scrambled by the RA-RNTI and being able to successfully decode the RAR (msg.2) information, and when the RAPID is consistent with the sent Preamble ID, the UE considers that the reception of the RAR message is successful, and considers that this CFRA process is successfully ended.

Figure 8:
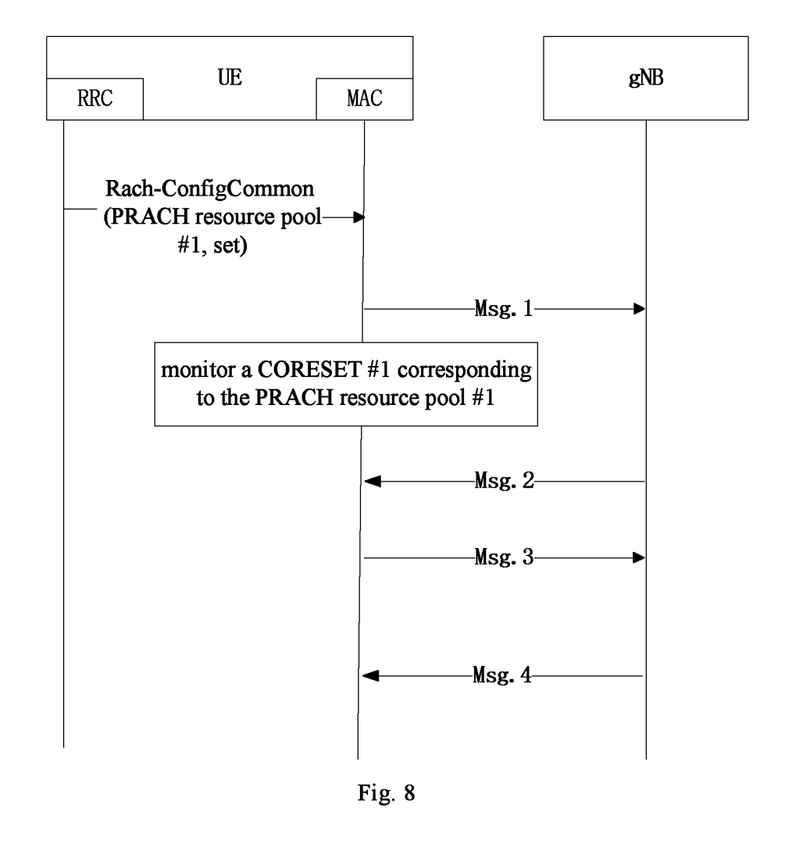
FIG. 8 is a flowchart of Example 5 of the present disclosure.

Example 5: during a CBRA procedure, selecting a corresponding CORE to be monitored RAR according to a mapping relationship between a PRACH resource pool and a CORE to be used Please refer to FIG. 8 for a detailed flowchart of this example. FIG. 8 is a flowchart of Example 5 of the present disclosure.

Step 1: after a UE normally resides in an NR cell, the UE needs to enter an RRC connection state, and at this time, the UE needs to initiate a random access process. The MAC layer of the UE first receives a contention random access configuration from the RRC message, acquires therefrom the PRACH resource pool #1 and the preamble set of the random access process, and randomly selects an RO and a preamble used in this RACH access from the PRACH resource pool and the preamble set.

Step 2: the UE transmits msg.1 using the RO and preamble selected through step 1

Step 3: the UE calculates an RA-RNTI through the selected RO

Step 4: the UE determines a corresponding CORESET #1 via a PDCCH resource pool #1 configured in step 1, in which the PDCCH resource pool #1 is mapped to the CORESET #1; an RA-RNTI obtained in step 3 is used to monitor the CORESET #1; and when receiving a PDCCH ORDER scrambled by the RA-RNTI and being able to successfully decode RAR (msg.2) information, and when an RAPID is consistent with a sent Preamble ID, the UE considers that the reception of the RAR message is successful, and sets a TC-RNTI according to message contents carried by the RAR Step 5: the UE sends Msg.3 to the gNB via the UL grant obtained by decoding the RAR message and according to the channel resource allocated by the UL grant, and requests to establish an RRC connection.

Step 6: the UE monitors the CORESET through the TC-RNTI obtained in step 4; when receiving a PDCCH order scrambled by the TC-RNTI and successfully decoding the msg.4 message, the UE considers that this random access contention is successful and enters an RRC connection state when the obtained cell of the ID for which the contention resolution is performed is consistent with the CCCH SDU of Msg.3.

Embodiment 3

The terminal avoids collision according to the access mode identification in the received RAR.

Example 6: in a CBRA procedure, an RA type flag carried in an RAR frame is used to identify a current access type.

Figure 9:
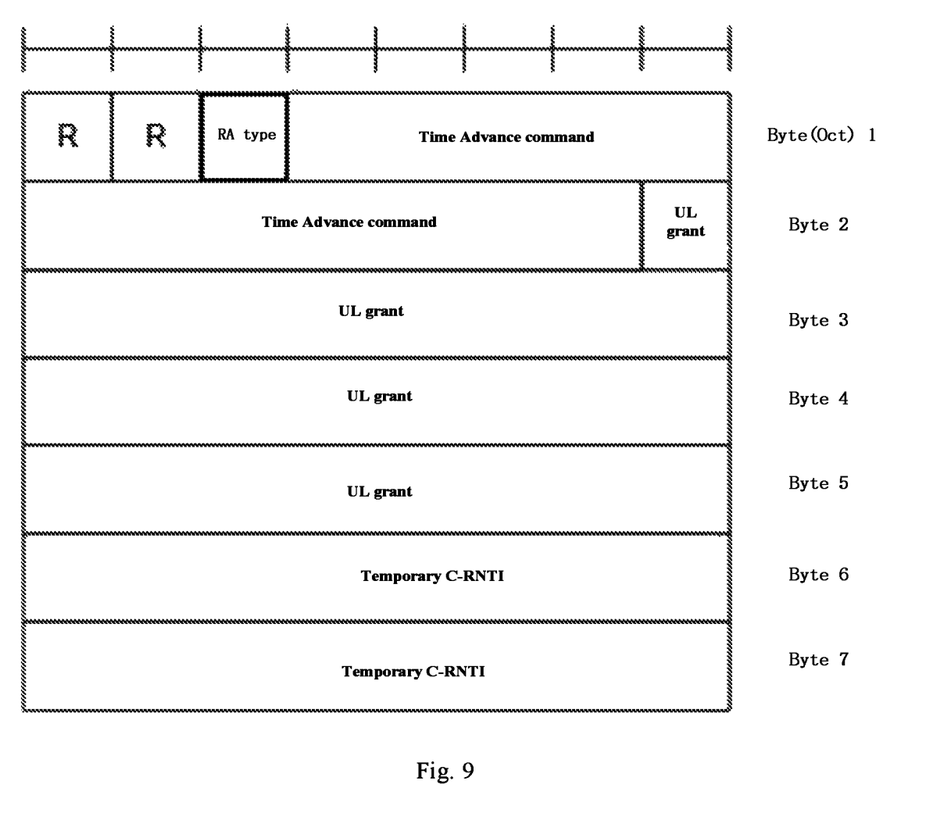
FIG. 9 is a structure diagram of an RAR frame according to Example 6 of the present disclosure.

The detailed flowchart of this embodiment refers to FIG. 1, the structure diagram of the RAR frame is referred to FIG. 9, and FIG. 9 is a structure diagram of the RAR frame according to Example 6 of the present disclosure.

Step 1: after a UE normally resides in an NR cell, the UE needs to enter an RRC connection state, and at this time, the UE needs to initiate a random access process. A MAC layer of a UE first receives a contention random access configuration from an RRC message, acquires a PRACH resource pool and a Preamble set which are able to be used in a random access process therefrom, and randomly selects an RO and a preamble used in this RACH access from the resource pool and the Preamble set.

Step 2: the UE transmits msg.1 using the RO and preamble selected through step 1

Step 3: the UE calculates the RA-RNTI through the selected PRACH resource

Step 4: the UE monitors the CORESET through the RA-RNTI calculated in step 3; when receiving a PDCCH ORDER scrambled by the RA-RNTI, and being able to successfully decode a frame header and frame information about the RAR, when an RAPID is consistent with a sent Preamble ID and an RA type indicator is consistent with a current CBRA access mode, in which when the RA type indicator=1, the CBRA is characterized, and when the RA type indicator=0, the CBRA is characterized. The UE considers that the reception of the RAR message is successful, and sets the TC-RNTI according to the contents of the message carried by the RAR message Step 5: the UE sends Msg.3 to the gNB via the UL grant obtained by decoding the RAR message and according to the channel resource allocated by the UL grant, and requests to establish an RRC connection.

Step 6: the UE monitors the CORESET through the TC-RNTI obtained in step 4; when receiving a PDCCH order scrambled by the TC-RNTI and successfully decoding the msg.4 message, the UE considers that this random access contention is successful and enters an RRC connection state when the obtained cell of the ID for which the contention resolution is performed is consistent with the CCCH SDU of Msg.3.

Example 7: in the CFRA process, identify the current resource pool by an RA type identifier carried in an RAR frame Please refer to FIG. 1 for the detailed flowchart of this embodiment, and refer to FIG. 9 for the structure diagram of the RAR frame.

Step 1: when a terminal camps on a current cell and is in a connected state, and when a CFRA process is triggered, the UE acquires a PRACH resource pool index required by the CFRA and a designated preamble from an RRC message.

Step 2: the user equipment selects an RO carrying a preamble signaling from the specified PRACH resource pool, and transmits the preamble pre-configured by the RRC over the selected RO.

Step 3: the UE calculates the RA-RNTI of the current transmission according to the currently selected RO.

Step 4: the UE monitors the CORESET according to the RA-RNTI calculated in step 3; after receiving the PDCCH ORDER scrambled by the RA-RNTI and successfully decoding the RAR (msg.2) frame, when the RAPID is consistent with the preamble ID sent and the mapping relationship between the RA type indicator and the currently used PRACH resource index is consistent, in which when the RA type indicator=1, the PRACH resource pool #1 is represented; and when the RA type indicator=0, the PRACH resource pool #0 is represented. The UE determines that this CFRA is successful.

The three mechanisms proposed in the present embodiment are adopted to redesign the RA-RNTI calculation method; redesigning a RAR receiving channel CORESET; Re-design RAR frame structure. With the network configuration of the re-NRs, possible contradictions due to the independent configuration of the CFRA and CBRA are solved. For the method 1, only the RA-RNTI calculation method needs to be redesigned, which does not affect the physical layer and does not affect the existing process. For the method 2, only CORESETs need to be classified, and existing processes do not need to be changed. For the method 3, only the reserved words in the existing RAR frame structure need to be given a new meaning, which slightly affects the existing process and does not affect the existing physical layer.

Embodiment 4

Embodiments of the present disclosure further provide a storage medium. The storage medium stores a computer program. The computer program is configured to execute the steps in any one of the method embodiments when running.

In an embodiment of the present disclosure, in this embodiment, the storage medium may be configured to store a computer program for executing the following steps:

S1, acquiring a random access resource pool or a random access type of a PRACH;

S2, receiving a random access response according to the random access resource pool or random access type.

In an embodiment of the present disclosure, in this embodiment, the storage medium may include, but is not limited to, any medium that can store a computer program, such as a USB flash drive, a Read-Only Memory (ROM), a Random Access Memory (RAM), a removable hard disk, a magnetic disk, or an optical disc.

Embodiments of the present disclosure further provide an electronic device, comprising a memory and a processor. The memory stores a computer program. The processor is configured to run the computer program to execute steps in any one of the method embodiments.

In an embodiment of the present disclosure, the electronic device can further comprise a transmission device and an input/output device, wherein the transmission device is connected to the processor, and the input/output device is connected to the processor.

In an embodiment of the present disclosure, in this embodiment, the processor may be arranged to execute the following steps via a computer program:

S1, acquiring a random access resource pool or a random access type of a PRACH;

S2, receiving a random access response according to the random access resource pool or the random access type.

Alternatively, for specific examples in this embodiment, reference may be made to the examples described in the foregoing embodiments and optional implementations, and details are not repeatedly described herein in this embodiment.

Obviously, those skilled in the art should understand that, the above-mentioned modules and steps of the present disclosure can be realized by a universal computing device, they may be centralized on a single computing device, or distributed on a network composed of a plurality of computing devices, optionally, they can be realized by using executable program codes of the calculation devices. Thus, they can be stored in a storage device and executed by the computing device, and in some cases, The shown or described steps may be executed in an order different from that described here, or they are made into integrated circuit modules, or a plurality of modules or steps therein are made into a single integrated circuit module for implementation. As such, the present disclosure is not limited to any particular hardware and software combination.

The foregoing descriptions are merely exemplary embodiments of the present disclosure, but are not intended to limit the present disclosure. For those skilled in the art, the present disclosure may have various modifications and variations. Any modifications, equivalent replacements, improvements and the like made within the principle of the present disclosure shall belong to the scope of protection of the present disclosure.

INDUSTRIAL APPLICABILITY

The present disclosure is applicable to the field of communications. A random access resource pool or a random access type of a PRACH is acquired, and random access response message is received according to the random access resource pool or the random access type. Confliction is avoided by using different random access manners, thereby solving the technical problem in the related art that a resource conflict is caused because a received RAR cannot be determined.

What is claimed is:

1. A random access method, comprising:

acquiring a random access resource pool or a random access type of a physical random access channel (PRACH);

receiving a random access response message according to the random access resource pool or the random access type;

wherein the method for receiving random access response message according to the random access resource pool or random access type comprises:

determining a physical resource for receiving the random access response message according to the random access resource pool or the random access type, wherein the physical resource comprises at least one of the following: a control resource set (CORESET), and bandwidth part (BWP);

determining a random access radio network temporary identifier (RA-RNTI) for receiving the random access response message according to the random access resource pool or the random access type;

receiving corresponding random access response (RAR) information using the physical resource and the RA-RNTI;

wherein determining the RA-RNTI for receiving the random access response message according to the random access resource pool or the random access type comprises:

a currently used RA-RNTI is calculated by using the following formula:

$$\text{A-RNTI}=1+s\_id+14\times t\_id+14\times 80\times f\_id+14\times 80\times 8\times ul\_carrier\_id+14\times 80\times 8\times 2\times \text{RA type};$$

wherein s_id is symbol identifier of a symbol of a used PRACH resource, t_id is a timeslot identifier of a slot of the used PRACH resource, f_id is a frequency division multiplexing (FDM) identifier of the used PRACH resource, ul_carrier_id is an uplink carrier identifier of the used PRACH resource, and an RA type value is an identifier of the random access resource pool or an identifier of the random access type.

2. The method according to claim 1, wherein acquiring the random access resource pool of the PRACH comprises one of the following:

acquiring a resource pool of a contention-based random access (CBRA) via a radio resource control (RRC) message;

acquiring a resource pool for a non-contention based random access (CFRA) via an RRC message;

acquiring a resource pool used for a system message request via an RRC message;

wherein the RRC message is a dedicated RRC message or a system message;

wherein the resource pool comprises at least one of the following: time domain information, frequency domain information and code domain information used for sending a random access preamble.

3. The method of claim 1, wherein the random access type comprises one of: CBRA, CFRA, a random access of a system message request.

4. The method according to claim 1, wherein the method for determining the physical resource for receiving the random access response message according to the random access resource pool or the random access type comprises:
determining a physical resource corresponding to the random access resource pool or a random access type and used for receiving the random access response message according to a mapping relationship, and monitoring the RA-RNTI on the corresponding physical resource;
wherein the mapping relationship is configured according to a RRC message.

5. The method according to claim 1, wherein the method for receiving corresponding RAR information according to the random access resource pool or the random access type comprises:
receiving corresponding RAR information in a random access response (RAR) message, wherein the corresponding RAR information is RAR information about an RAP ID matching a preamble ID used in the current RA process;
parsing the RAR information to obtain first identification information about the random access type or second identification information about the random access resource pool carried in the RAR message;
when the first identifier matches the random access type in the current RA process, determining that the received RAR information is the response message for the current random access; or determining that the received RAR information is the response message for the current random access when the second identifier matches the resource pool used in the current RA procedure.

6. The method of claim 5, further comprising:
when the first identifier does not match the random access type, determining that the received RAR information is not a response message for the current random access; or determining that the RAR information received is not the response message for the current random access when the second identifier does not match the resource pool used in the current RA process.

7. The method according to claim 1, wherein after acquiring the random access resource pool or the random access type of the PRACH, the method further comprises:
calculating a currently used RA-RNTI;
monitoring a control resource set (CORESET) by using the RA-RNTI.

8. The method according to claim 7, wherein monitoring the CORESET by using the RA-RNTI comprises one of:
monitoring a dedicated CORESET corresponding to the random access type by using a random access radio network temporary identifier (RA-RNTI);
monitoring a dedicated CORESET corresponding to the random access resource pool by using a random access radio network temporary identifier (RA-RNTI).

9. A random access method, comprising:
receiving, by a network side, a random access preamble; and
sending a random access response (RAR) message according to a random access resource pool or a random access type corresponding to the random access preamble;
determining a physical resource for receiving the random access response message according to the random access resource pool or the random access type,
wherein the physical resource comprises at least one of the following: a control resource set (CORESET), and bandwidth part (BWP);
determining a random access radio network temporary identifier (RA-RNTI) for receiving the random access response message according to the random access resource pool or the random access type;
receiving corresponding random access response (RAR) information using the physical resource and the RA-RNTI;
wherein determining the RA-RNTI for receiving the random access response message according to the random access resource pool or the random access type comprises:
a currently used RA-RNTI is calculated by using the following formula:

$$RA\text{-}RNTI = 1 + s\_id + 14 \times t\_id + 14 \times 80 \times f\_id + 14 \times 80 \times 8 \times ul\_carrier\_id + 14 \times 80 \times 8 \times 2 \times RA\ type;$$

wherein s_id is symbol identifier of a symbol of a used PRACH resource, t_id is a timeslot identifier of a slot of the used PRACH resource, f_id is a frequency division multiplexing (FDM) identifier of the used PRACH resource, ul_carrier_id is an uplink carrier identifier of the used PRACH resource, and an RA type value is an identifier of the random access resource pool or an identifier of the random access type.

10. A terminal, comprising:
an acquisition module, configured to acquire a random access resource pool or a random access type of a physical random access channel (PRACH); and
a receiving module, configured to receive random access response according to the random access resource pool or the random access type;
the terminal is further configured to:
determine a physical resource for receiving the random access response message according to the random access resource pool or the random access type, wherein the physical resource comprises at least one of the following: a control resource set (CORESET), and bandwidth part (BWP);
determine a random access radio network temporary identifier (RA-RNTI) for receiving the random access response message according to the random access resource pool or the random access type;
receive corresponding random access response (RAR) information using the physical resource and the RA-RNTI;
wherein a currently used RA-RNTI is calculated by using the following formula:

$$RA\text{-}RNTI = 1 + s\_id + 14 \times t\_id + 14 \times 80 \times f\_id + 14 \times 80 \times 8 \times ul\_carrier\_id + 14 \times 80 \times 8 \times 2 \times RA\ type;$$

wherein s_id is symbol identifier of a symbol of a used PRACH resource, t_id is a timeslot identifier of a slot of the used PRACH resource, f_id is a frequency division multiplexing (FDM) identifier of the used PRACH resource, ul_carrier_id is an uplink carrier identifier of the used PRACH resource, and an RA type value is an identifier of the random access resource pool or an identifier of the random access type.

11. A non-transitory storage medium, wherein the storage medium stores a computer program, wherein the computer program is configured to run to execute the method as claimed in claim 1.

12. An electronic device, comprising a memory and a processor, wherein the memory stores a computer program, and the processor is configured to run the computer program so as to execute the method as claimed in claim 1.

13. An electronic device, comprising a memory and a processor, wherein the memory stores a computer program, and the processor is configured to run the computer program so as to execute the method as claimed in claim 2.

14. An electronic device, comprising a memory and a processor, wherein the memory stores a computer program, and the processor is configured to run the computer program so as to execute the method as claimed in claim 3.

15. An electronic device, comprising a memory and a processor, wherein the memory stores a computer program, and the processor is configured to run the computer program so as to execute the method as claimed in claim 4.

16. An electronic device, comprising a memory and a processor, wherein the memory stores a computer program, and the processor is configured to run the computer program so as to execute the method as claimed in claim 5.

* * * * *